(12) United States Patent
Starnes, Jr.

(10) Patent No.: US 7,553,897 B2
(45) Date of Patent: *Jun. 30, 2009

(54) ORGANIC THIOL STABILIZERS AND PLASTICIZERS FOR HALOGEN-CONTAINING POLYMERS

(75) Inventor: William H Starnes, Jr., Williamsburg, VA (US)

(73) Assignee: College of William and Mary, Williamsbury, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/622,207

(22) Filed: Jan. 11, 2007

(65) Prior Publication Data

US 2007/0161728 A1 Jul. 12, 2007

Related U.S. Application Data

(60) Provisional application No. 60/757,953, filed on Jan. 11, 2006.

(51) Int. Cl.
| | |
|---|---|
| *C08K 5/36* | (2006.01) |
| *C08K 5/37* | (2006.01) |
| *C08K 5/10* | (2006.01) |
| *C07C 69/12* | (2006.01) |
| *C07C 323/54* | (2006.01) |
| *C07C 321/02* | (2006.01) |

(52) U.S. Cl. .............. 524/302; 524/289; 524/307; 524/311; 524/392; 568/63

(58) Field of Classification Search ............... 524/302, 524/392, 289, 307, 311; 568/63
See application file for complete search history.

(56) References Cited

U.S. PATENT DOCUMENTS

| 4,067,841 | A * | 1/1978 | Aurichio ................ 524/113 |
| 4,080,364 | A * | 3/1978 | Kauder et al. ............. 524/101 |
| 6,747,081 | B2 * | 6/2004 | Starnes, Jr. ............... 524/392 |
| 6,762,231 | B2 * | 7/2004 | Starnes et al. ............. 524/289 |
| 7,312,266 | B2 * | 12/2007 | Starnes et al. ............. 524/289 |
| 2002/0103277 | A1 * | 8/2002 | Duvall ................... 524/110 |
| 2004/0220310 | A1 * | 11/2004 | Starnes et al. ............. 524/289 |
| 2008/0045635 | A1 * | 2/2008 | Ishizuka et al. ............ 524/106 |

* cited by examiner

*Primary Examiner*—Harold Y. Pyon
*Assistant Examiner*—Michael Pepitone
(74) *Attorney, Agent, or Firm*—Jason P. McDevitt

(57) ABSTRACT

A novel organic thiol stabilizer for PVC is described herein. Specifically, this novel thiol stabilizer for PVC is dipentaerythritol hexakis(mercaptoacetate). The organic thiol stabilizer of the present invention, when blended with halogen-containing polymers such as PVC, or derivatives thereof, provides advantages in cost and/or performance relative to existing organic stabilizers for PVC.

4 Claims, No Drawings

ORGANIC THIOL STABILIZERS AND PLASTICIZERS FOR HALOGEN-CONTAINING POLYMERS

CROSS-REFERENCE TO RELATED APPLICATIONS

This application claims priority to U.S. Provisional Application No. 60/757,953, filed Jan. 11, 2006.

STATEMENT REGARDING FEDERALLY SPONSORED RESEARCH OR DEVELOPMENT

N/A

BACKGROUND OF THE INVENTION

Chlorine-containing resins, particularly poly(vinyl chloride) ("PVC") polymers and copolymers, are unstable to heat and light. Exposure to heat and light can cause degradation of the polymers, resulting in changes in the physical properties thereof. This degradation is typically manifested by changes in color, and is particularly noticeable in unstabilized polymers, i.e., polymers that do not contain stabilizers. Degradation or discoloration during processing is particularly undesirable in clear or lightly colored plastics. Therefore, it is desirable to prevent or inhibit the discoloration of plastics during processing so as to achieve useful products free of discoloration.

In order to minimize the discoloration and deterioration of various halogen-containing polymers such as vinyl chloride polymers and copolymers, stabilizers have been incorporated into the polymers. Frequently, these stabilizers contain heavy metals such as lead and cadmium. Environmental concerns with existing stabilizers have stimulated interest in alternative stabilizers, including organic stabilizers. For example, U.S. Pat. No. 3,928,285 to Gough et al. describes a synergistic stabilizer composition comprising an organotin borate and an organic thiol. In U.S. Pat. No. 4,948,827, Christidis describes a thiophenol having utility as a stabilizer. European Patent Application No. EP 0 945 484 A1 relates to compositions comprising halogen-containing polymers such as PVC resins that are stabilized against heat by a synergistic combination of a free mercaptan and a metal-based stabilizer and/or a Lewis acid such as zinc chloride. JP 63241055 A2 describes the compound dipentaerythritol hexakis(3-mercaptopropionate), and a method for stabilizing PVC with said compound. Starnes et al. describe numerous organic thiol stabilizers for PVC in U.S. Pat. Nos. 6,667,357, 6,762,231, 6,747,081, and 6,927,247, and published U.S. Patent Application Nos. 20050049307 and 20040220310.

While substantial efforts have been made to develop organic stabilizers for PVC, such stabilizers have achieved little commercial success, primarily as a result of their inability to compete with traditional stabilizers on a cost/performance basis.

BRIEF SUMMARY OF THE INVENTION

A novel organic thiol stabilizer and plasticizer for PVC is described herein. Specifically, this novel thiol stabilizer for PVC is dipentaerythritol hexakis(mercaptoacetate). A synthetic route for preparation of this novel PVC stabilizer is disclosed herein. Dipentaerythritol hexakis(mercaptoacetate), when blended with a halogen-containing polymer such as PVC, or derivatives thereof, provides numerous advantages which include serving as a plasticizer, stabilizer, and dehydrochlorination retarder. Relative to existing organic stabilizers for PVC, the thiol stabilizer of the present invention has substantial advantages in cost and/or performance.

DETAILED DESCRIPTION OF THE INVENTION

The thiol stabilizer of the present invention is a known compound, and can be synthesized via a simple synthetic route from inexpensive, commercially available precursors. Dipentaerythritol hexakis(mercaptoacetate) [CAS Registry Number 33250-21-4, molecular formula $C_{22}H_{34}O_{13}S_6$]

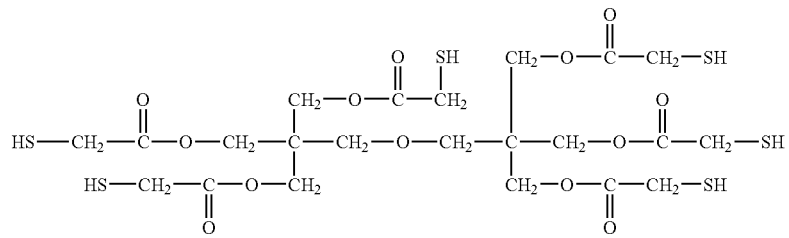

has been described on numerous occasions, and has been suggested for use in shrinkproofing wool textiles (Dobinson et al., Ger. Offen. (1971), DE 2042989 19710311), and as an intermediate in the production of other chemicals, among other uses. It can be produced by acid-catalyzed reaction of dipentaerythritol and mercaptoacetic acid (thioglycolic acid).

Herein, dipentaerythritol hexakis(mercaptoacetate) is demonstrated as a particularly effective stabilizer for halogen-containing polymeric compounds. It also functions as a plasticizer. The thiol stabilizer of the present invention may be used in conjunction with other stabilizers for PVC, including metal-based stabilizers. Metal-based stabilizers are herein defined as any metal compound, salt, or complex of any of the metals as set forth in groups 1-8 of the periodic table, including heavy metals such as cadmium, mercury, lead, wherein said metal compound, salt, or complex is useful for stabilizing PVC polymers.

The polymers utilized in the present invention include any organic chlorine- or bromine-containing polymers or resins in which the halogen is attached directly to a carbon atom. Polymers useful to the present invention include, but are not limited to, poly(vinyl chloride) (PVC), poly(vinylidene chloride), poly(vinyl bromide), poly(vinylidene bromide), chlorinated poly(vinyl chloride), chlorinated polyethylene, chlorinated natural or synthetic rubber, polychloroprene, rubber hydrochloride, or chlorinated polystyrene, vinyl chloride copolymers (for the purpose of this patent application, the term "vinyl chloride copolymers" refers to copolymers synthesized from vinyl chloride and one or more additional ethylenically unsaturated monomers), and combinations thereof. The molecular weight of such polymers can vary over a wide range, and they generally have a number average molecular weight of from about 5,000 to about 1,000,000, or from about 10,000 to 100,000 for PVC. Such polymers can also contain other plasticizers in addition to the compounds of the present invention, as well as other additives commonly used in the art including but not limited to stabilizers, colorants, lubricants, plasticizers, extenders, impact modifiers, fillers, antioxidants, ultraviolet light absorbing agents, and densifying agents.

The above noted chlorine- or bromine-containing polymers are made from monomers such as vinyl chloride, vinylidene chloride, and the like; or are a vinyl chloride copolymer made from a mixture of monomers comprising, desirably, at least about 70% by weight of vinyl chloride, based on the total monomer weight. Examples of the vinyl chloride copolymers include those made from vinyl chloride and from about 1 to about 30% of a copolymerizable ethylenically unsaturated monomer such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate, and chloroallylidene diacetate. For example, vinyl chloride copolymers include vinyl chloride-vinyl acetate (e.g. 96:4 sold commercially as VYNW), vinyl chloride-vinyl acetate (e.g. 87:13), vinyl chloride-vinyl acetate-maleic anhydride (e.g. 86:13:1), vinyl chloride-vinylidene chloride (e.g. 95:5), vinyl chloride-diethyl fumarate (e.g. 95:5), and vinyl chloride-2-ethylhexyl acrylate (e.g. 80:20).

Preferred polymers include PVC and poly(vinyl bromide). Preferred vinyl chloride copolymers include vinyl chloride-vinyl acetate and vinyl chloride-vinylidene chloride.

The thiol stabilizer of the present invention can be added to or blended with the above described polymers in any suitable amount, generally from about 0.1 to about 100 parts by weight of dipentaerythritol hexakis(mercaptoacetate) per 100 total parts by weight of all of the one or more polymers or copolymers, depending on the desired properties of the final product such as being plasticized. A rigid or semi-rigid composition of the present invention would desirably contain from about 0.1 to about 25 parts of dipentaerythritol hexakis (mercaptoacetate) per 100 parts by weight of a polymer defined above, preferably between about 1 and about 5 parts of dipentaerythritol hexakis(mercaptoacetate) by weight per 100 parts by weight of the polymer. A flexible composition of this invention contains from about 0.1 to about 100 parts of dipentaerythritol hexakis(mercaptoacetate) per 100 parts of polymer, depending on the concentration of other plasticizers in the formulation. While stabilizers are routinely incorporated into PVC at ratios of about 1 to about 5 parts stabilizer per 100 parts by weight of polymer, it is contemplated that the thiol stabilizer of the present invention may be used in combination with other stabilizers, and thus may be used at lower levels than are typically observed for stabilizers in PVC. Dipentaerythritol hexakis(mercaptoacetate) can be incorporated into the resin by any one of many known methods that provide for uniform distribution of additives throughout resin compositions (e.g., mixing in an appropriate mill, mixer, or Banbury apparatus).

Depending on the end use, further additives, known to the art and to the literature or to those of ordinary skill in the art, can be added in suitable amounts to the above-noted polymers, including certain other stabilizers and costabilizers, lubricants, plasticizers, extenders, impact modifiers, fillers, pigments, antioxidants, dyes, ultraviolet light absorbing agents, densifying agents, and the like.

The addition of epoxidized soybean oil (ESO) to compositions of the present invention can potentially increase the effectiveness of the thiol stabilizer under certain conditions. Generally, epoxidized soybean oil is utilized in chlorine- or bromine-containing polymers as an HCl scavenger. Epoxidized soybean oil can be utilized in compositions of the present invention in an amount generally from about 1 to about 30 parts, desirably from about 2 to about 20 parts, and preferably from about 3 to about 10 parts by weight per 100 parts by weight of chlorine- or bromine-containing polymer.

As stated above, the presence of dipentaerythritol hexakis (mercaptoacetate) can greatly enhance the heat stability of halogenated resins, which are known to undergo rapid thermal degradation under the conditions found in the processes to which these resins are subjected, such as, for example, calendering, extrusion, injection molding, and end usage at elevated temperatures. For example, PVC is known to undergo a rapid and sequential elimination of hydrogen chloride, or dehydrochlorination, at elevated process temperatures. Other halogenated resins are known to undergo similar dehydrohalogenation reactions. Dehydrochlorination in PVC can initiate at labile chlorines that are associated with irregularities in the molecular chain, such as branches or double bonds. Once released, the liberated HCl promotes further degradation of the PVC chain through unzipping of additional hydrogen chloride from the polymer chain. The primary functions of heat stabilizers in PVC are to depress hydrogen chloride elimination and discoloration.

The following examples serve to illustrate, but not to limit, the present invention.

EXAMPLES

The invention is now described with reference to the following examples. These examples are provided for the purpose of illustration only and the invention should in no way be construed as being limited to these examples but rather should be construed to encompass any and all variations which become evident as a result of the teaching provided herein.

Example 1

In this example, we have pursued a series of studies of model compounds. These studies provide an explanation as to why the thiol stabilizer of the present invention can be more effective than some previously suggested thiol stabilizers. These studies of model compounds address the question of how the molecular structure of the thiol stabilizers influences their ability to stabilize PVC. In order to address this question, we set up a series of reactions that model degradation and stabilization processes common in PVC.

5-Chloro-5-methylnonane (1) is a crude model for the thermally labile tertiary chloride groups in the polymer. (E)-6-Chloro-4-nonene (3) models another unstable defect, while (E,E)-3,5-nonadiene (4) is the product of its dehydrochlorination. (E)-1-Chloro-2-nonene (2) models a long-chain end that also occurs in PVC but does not contribute significantly to its thermal instability. In nucleophilic chloride displacements, the mechanisms for 1, 2, and 3 are expected to be predominantly SN1, SN2, and a mixture of SN1 and SN2, respectively.

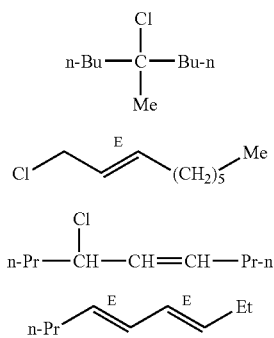

Thiol stabilizers were modeled by three compounds with a range of acidity levels. Dodecanethiol ($CH_3(CH_2)_{10}CH_2SH$, 7) has the highest pKa of the thiol stabilizer model compounds, followed by 2-ethylhexyl 2-mercaptopropionate (6), followed by the substituted thiophenol derivative 2-ethylhexyl 3-mercaptobenzoate (5).

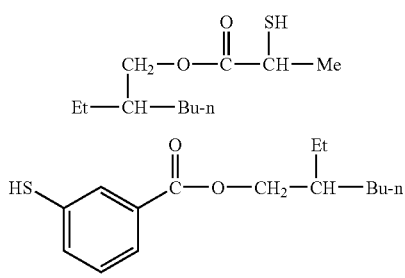

The thiol stabilizer model compounds were heated with the various PVC model compounds at 80° C. and 160° C., and the yields of the resulting sulfides are reported in Table 1. The reactions were run for four hours using a 1:1 molar ratio of thiol compound to PVC model compound. Under the conditions used for these experiments, 2-ethylhexyl 3-mercaptobenzoate did not react with (E)-7-tetradecene or with 6-chloroundecane, a rudimentary model system for the ordinary monomer units of the polymer.

Among the most striking results in Table 1 are the high yields of sulfides obtained from the reactions of the thiophenol derivative 5 with the chlorononene model compounds 2 and 3. In contrast, the yields derived from reaction of the three different thiols with 5-chloro-5-methylnonane (1) were lower, and differed from each other by only about a factor of two.

The expected order of thiol nucleophilicity among the thiol stabilizer model compounds is RSH>Me($CO_2R$)CHSH>ArSH, i.e., 7>6>5, but the sulfide yields resulting from reaction of the thiol nucleophiles with PVC model compounds did not follow this trend. In contrast, the expected order of thiolate anion concentration is ArS$^-$>Me($CO_2R$)CHS$^-$>RS$^-$, i.e., 5>6>7, based on approximate $pK_a$ values for 5, 6, and 7 of 6.0, 8.25, and 10.5, respectively (all estimated $pK_a$ values in this patent application were calculated using Advanced Chemistry Development [ACD/Labs] Software V8.14 for Solaris [©1994-2006 ACD/Labs]). The sulfide yields resulting from reaction of the thiol stabilizer model compounds with PVC model compounds 1, 2, and 3 generally parallel the thiolate anion concentrations. These observations strongly suggest that in the reactions of these substrates, the effective nucleophiles were the thiolate anions, rather than the thiols themselves. Ester thiols can destroy both tertiary chloride and allylic chloride structures by nucleophilic displacement, and, at least in the latter instance, thiolate anion concentration (as determined by thiol acidity) may be more important than the nucleophilicity of the neutral thiol. Accordingly, when seeking superior thiol stabilizers, and choosing between otherwise similar compounds, the compound with a lower $pK_a$ is likely to be the most effective stabilizer for PVC.

This finding is particularly relevant for the thiol nucleophile of the present invention. Dipentaerythritol hexakis(3-mercaptopropionate) [CAS Registry No. 25359-71-1, molecular formula: $C_{28}H_{46}O_{13}S_6$] is a commercially available substance that has been previously used as a stabilizer for PVC (JP 63241055A2), but it has not been commercially developed. The estimated $pK_a$ of dipentaerythritol hexakis(3-mercaptopropionate) is 8.79±0.25. In contrast, the thiol stabilizer of the present invention, while structurally similar to dipentaerythritol hexakis(3-mercaptopropionate), has a significantly lower $pK_a$ value because of the increased proximity of the thiol group to the electron-withdrawing ester group. The estimated $pK_a$ of dipentaerythritol hexakis(mercaptoacetate) is 7.26±0.25.

A reduced $pK_a$ value, and therefore a higher thiolate concentration, is not the only advantage possessed by dipentaerythritol hexakis(mercaptoacetate) as a stabilizer relative to dipentaerythritol hexakis(3-mercaptopropionate). It also has a substantially lower molecular weight, resulting in a

TABLE 1

Sulfide Percentage Yields from Reaction of Thiols with Model Compounds

| PVC Model Compound | Thiol Stabilizer Model Compound | | | | | |
|---|---|---|---|---|---|---|
| | ArSH (5) | | Me($CO_2R$)CHSH (6) | | RSH (7) | |
| | (160° C.) | (80° C.) | (160° C.) | (80° C.) | (160° C.) | (80° C.) |
| 1 | 19 | 1 | 20 | 1 | 9 | 0 |
| 2 | 100 | 4 | 24 | 1 | 14 | <1 |
| 3 | 88 | 33 | 6 | <1 | 9 | 0 |
| 4 | 51 | 14 | 5 | <1 | 8 | <1 | greater concentration of thiol groups per unit mass. Furthermore, it can be produced at a lower cost as a result of the lower price of the thioglycolic acid precursor.

Example 2

Dipentaerythritol hexakis(mercaptoacetate) was prepared in the following manner. A solution of dipentaerythritol (76.5 g, 0.301 mol), thioglycolic acid (193.4 g, 2.100 mol), and p-toluenesulfonic acid (1.50 g, 8.71 mmol) in toluene (750 mL) was degassed by bubbling with nitrogen and then stirred and heated under reflux in a nitrogen atmosphere while the water that was formed was collected in a water separator. After 24 hours, water production had ceased, and 28 mL (1.8 mol) of water had accumulated. Heating then was stopped, and the mixture was allowed to cool under nitrogen while stirring was continued. The cooled mixture consisted of three liquid phases. After separation, the bottom phase was stirred with sodium bicarbonate solution until a stable pH value of 9 was observed. Centrifugation of the resulting emulsion afforded a clear organic layer under a stable emulsion layer and an aqueous top layer. The two lower layers were combined and washed twice with deionized water, with further recourse to centrifugation in order to enable separation of the aqueous washings. Afterward, the two lower layers were subjected to evaporation at 80° C. under reduced pressure (5 torr) to produce a viscous cloudy liquid (fraction A), and the combined washings were extracted with toluene while again using centrifugation in order to effect separation. The toluene extract was freed of solvent under vacuum to obtain a second viscous cloudy liquid residue (fraction B). Following their combination, fractions A and B were dispersed in dichloromethane to produce a milky solution that was filtered and then washed with aqueous sodium bicarbonate until the pH stabilized at a value of 9. The lowest layer (fraction C) of the resultant three-phase mixture was separated, and the intermediate (emulsion) layer was centrifuged to form an aqueous layer and an underlying organic layer (fraction D) that was separated and combined with fraction C. The combined layers were washed twice with deionized water, and the recovered organic (lower) phase was evaporated in vacuo at 70° C. to give a colorless viscous liquid residue that weighed 122 g (yield, 58%) and was shown to be essentially pure dipentaerythritol hexakis(mercaptoacetate) by NMR analyses: $^1$H NMR (400 MHz, in $CDCl_3$ w/TMS, ppm): 2.05 (t, J=8.4 Hz, 6H, SH), 3.29 (d, J=8.4 Hz, 12H, $CH_2SH$), 3.46 (s, 4H, $CH_2OCH_2$), and 4.20 (s, 12H, $CO_2CH_2$); $\{^1H\}^{13}C$ NMR (101 MHz, in $CDCl_3$ w/TMS, ppm): 26.32 ($CH_2CO2$), 43.51 $[C(CH_2)_4]$, 63.12 ($CO_2CH_2$), 69.31 ($CH_2OCH_2$), and 170.34 (C=O).

Example 3

In the following example, dipentaerythritol hexakis(mercaptoacetate) (hereafter "8" within this Example 3) was compounded in a PVC formulation, and compared as a stabilizer with other chemically similar compounds that also function as stabilizers for PVC, namely dipentaerythritol hexakis(2-mercaptopropionate) (hereafter "9" within this Example 3) and dipentaerythritol hexakis(3-mercaptopropionate) (hereafter "10" within this Example 3). Dipentaerythritol hexakis (3-mercaptopropionate), a pale straw-colored oil, was purchased from a commercial vendor and shown to have a purity of 99+% by NMR analysis. Dipentaerythritol hexakis(2-mercaptopropionate) was prepared from dipentaerythritol and 2-mercaptopropionic acid in a manner analogous to the synthesis of dipentaerythritol hexakis(mercaptoacetate), yielding a white solid with a melting range of 125-127° C. and purity of greater than 99% by NMR analysis.

The thiol stabilizers were independently compounded into PVC formulations by grinding a mixture of the selected stabilizer with powdered PVC (from a commercial source) using a mortar and pestle at liquid nitrogen temperature. In samples A through D below, the weight ratio of PVC to stabilizer was 100:3. A control sample (sample A) was included in which no stabilizer was added. In samples E through G below, the formulations additionally included epoxidized soybean oil ("ESO"), and were formulated with a PVC:ESO:stabilizer weight ratio of 100:5:3. The formulations are summarized in Table 2 below, with all numbers expressed as weight ratios.

TABLE 2

| Sample | PVC | ESO | 8 | 9 | 10 |
|---|---|---|---|---|---|
| A | 100 | 0 | 0 | 0 | 0 |
| B | 100 | 0 | 0 | 3 | 0 |
| C | 100 | 0 | 3 | 0 | 0 |
| D | 100 | 0 | 0 | 0 | 3 |
| E | 100 | 5 | 0 | 3 | 0 |
| F | 100 | 5 | 3 | 0 | 0 |
| G | 100 | 5 | 0 | 0 | 3 |

The samples were degraded by heating them at 180° C., for either 30 minutes or 60 minutes, under air in an oil bath that was temperature-controlled to within 1° C. Degraded samples were powdered to the maximum possible extent by grinding with a mortar and pestle. Color photographs of these samples were taken on a white background and used for the color measurements. A commercial software program (Adobe Photoshop Elements) was used to perform an image analysis of the digital pictures to obtain RGB values, which were subsequently converted to LAB values (in accordance with ASTM D2244). Table 3 provides dL and dE color values for the samples after the specified duration of heating, as compared with a reference standard.

Ideally, samples containing a preferred heat stabilizer for PVC will impede the initial formation of color upon heating, and generate less color over time. Under the test conditions, neither dL nor dE values provide a perfect quantitative measure of the desired output, as the samples do not simply darken, but instead undergo significant color changes, with different hues, as various degradation intermediates and products are formed. The dL and dE values (ideally both would be close to zero; the sum of the absolute values of the dL and dE values is a good approximation of the desired test measure) shown in Table 3 support the fact that samples containing dipentaerythritol hexakis(mercaptoacetate) as a stabilizer provided superior stabilization relative to control samples and also relative to PVC samples containing thiols 9 and 10 as stabilizers (samples C and F in Table 2 and Table 3 contained the thiol stabilizer of the present invention). The differences were clearly visible to the naked eye, and, under the test conditions, as a stabilizer for PVC, dipentaerythritol hexakis(mercaptoacetate) was unambiguously superior to the other thiol stabilizers that were tested.

TABLE 3

| Sample | Heat Time | dL | dE |
|---|---|---|---|
| A | 30 | −73.22 | 77.47 |
| B | 30 | −28.33 | 74.16 |
| C | 30 | −14.05 | 76.38 |
| D | 30 | −29.46 | 62.55 |
| A | 60 | −86.25 | 86.98 |

TABLE 3-continued

| Sample | Heat Time | dL | dE |
|---|---|---|---|
| B | 60 | −37.13 | 65.01 |
| C | 60 | −16.90 | 63.14 |
| D | 60 | −37.22 | 66.19 |
| E | 30 | −21.33 | 76.57 |
| F | 30 | −21.75 | 54.20 |
| G | 30 | −16.51 | 60.87 |
| E | 60 | −26.10 | 74.77 |
| F | 60 | −22.22 | 63.53 |
| G | 60 | −21.32 | 67.94 |

All publications and patent applications mentioned in the specification are indicative of the level of those skilled in the art to which this invention pertains. Although the foregoing invention has been described in some detail by way of illustration and example for purposes of clarity of understanding, it will be obvious that certain changes and modifications may be practiced within the scope of the representative embodiments of these concepts presented below. The appended claims are intended to be construed to include all such embodiments and equivalent variations.

I claim:

1. A polymer composition comprising:
   (A) a chlorine-containing or bromine-containing polymer; and
   (B) a first stabilizer component comprising dipentaerythritol hexakis(mercaptoacetate); and
   (C) a second stabilizer component comprising a metal-based stabilizer;
   wherein the amount of said first stabilizer component is between 0.25 and 3.5 parts by weight per 100 parts by weight of said polymer, and wherein the amount of said second stabilizer component is between 0.25 and 3.5 parts by weight per 100 parts by weight of said polymer.

2. The polymer composition of claim 1, wherein said polymer composition further comprises epoxidized soybean oil.

3. The polymer composition of claim 1, wherein said polymer is selected from the group consisting of poly(vinyl chloride), poly(vinylidene chloride), chlorinated poly(vinyl chloride), poly(vinyl bromide), and vinyl chloride copolymers.

4. The polymer composition of claim 1, wherein said polymer is poly(vinyl chloride).

* * * * *